US010592361B2

(12) United States Patent
Yang et al.

(10) Patent No.: US 10,592,361 B2
(45) Date of Patent: Mar. 17, 2020

(54) METHOD, SYSTEM AND APPARATUS FOR MANAGING PRIMARY AND SECONDARY DATABASES

(71) Applicant: Alibaba Group Holding Limited, George Town (KY)

(72) Inventors: Zhenkun Yang, Hangzhou (CN); Gui Huang, Hanzghou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/394,315

(22) Filed: Apr. 25, 2019

(65) Prior Publication Data

US 2019/0251008 A1    Aug. 15, 2019

Related U.S. Application Data

(63) Continuation of application No. PCT/CN2017/115392, filed on Dec. 11, 2017.

(30) Foreign Application Priority Data

Dec. 20, 2016  (CN) .......................... 2016 1 1183638

(51) Int. Cl.
*G06F 11/00* (2006.01)
*G06F 11/20* (2006.01)
(Continued)

(52) U.S. Cl.
CPC ........ *G06F 11/2041* (2013.01); *G06F 11/142* (2013.01); *G06F 11/1458* (2013.01);
(Continued)

(58) Field of Classification Search
CPC ............... G06F 11/2041; G06F 11/142; G06F 11/2025; G06F 11/2046; G06F 11/2043;
(Continued)

(56) References Cited

U.S. PATENT DOCUMENTS 7,496,701 B2 * 2/2009 Crawford ............ G06F 11/1484
710/62
9,009,444 B1 * 4/2015 Derbeko ............... G06F 11/006
711/113
(Continued)

FOREIGN PATENT DOCUMENTS

CN      102831038      12/2012
CN      103593266      2/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Philip Guyton
(74) *Attorney, Agent, or Firm* — Fish & Richardson P.C.

(57) ABSTRACT

The present application describes techniques for managing primary and secondary databases. One example method includes determining whether a lock held by a primary database expires, wherein the primary database and the secondary databases share the lock; in response to determining that the lock held by the primary database has expired, determining whether a lock renewal request of the primary database has been received; and in response to determining that the lock renewal request of the primary database has not been received, selecting a particular secondary database from the secondary databases as a new primary database, and controlling the primary database to be switched to the particular secondary database.

20 Claims, 16 Drawing Sheets

(51) Int. Cl.
*G06F 16/21* (2019.01)
*G06F 11/14* (2006.01)
*G06F 16/27* (2019.01)
*G06F 16/23* (2019.01)

(52) U.S. Cl.
CPC ...... *G06F 11/2025* (2013.01); *G06F 11/2028* (2013.01); *G06F 11/2033* (2013.01); *G06F 11/2043* (2013.01); *G06F 16/21* (2019.01); *G06F 16/2343* (2019.01); *G06F 16/27* (2019.01)

(58) Field of Classification Search
CPC ............. G06F 11/2028; G06F 11/2033; G06F 16/2343
See application file for complete search history.

(56) References Cited

U.S. PATENT DOCUMENTS

| | | | | |
|---|---|---|---|---|
| 9,116,862 | B1* | 8/2015 | Rath | G06F 11/2097 |
| 9,274,902 | B1* | 3/2016 | Morley | G06F 11/2002 |
| 9,667,490 | B1* | 5/2017 | Emelyanov | H04L 41/0816 |
| 2004/0003317 | A1 | 1/2004 | Kwatra et al. | |
| 2004/0123053 | A1* | 6/2004 | Karr | G06F 11/0727 711/152 |
| 2005/0022047 | A1* | 1/2005 | Chandrasekaran | G06F 16/2343 714/5.11 |
| 2006/0010351 | A1 | 1/2006 | Lee | |
| 2011/0137879 | A1* | 6/2011 | Dubey | G06F 16/1774 707/704 |
| 2012/0233496 | A1 | 9/2012 | Gil et al. | |
| 2015/0339200 | A1* | 11/2015 | Madduri | G06F 11/2028 714/4.11 |

FOREIGN PATENT DOCUMENTS

| | | |
|---|---|---|
| CN | 104778102 | 7/2015 |
| CN | 106202075 | 12/2016 |
| CN | 107066480 | 8/2017 |
| TW | I529624 | 4/2016 |

OTHER PUBLICATIONS

Nakamoto, "Bitcoin: A Peer-to-Peer Electronic Cash System," www.bitcoin.org, 2005, 9 pages.

International Preliminary Report on Patentability in International Application No. PCT/CN2017/115392, dated Jun. 25, 2019, 9 pages (with English Translation).

International Search Report and Written Opinion in International Application No. PCT/CN2017/115392, dated Mar. 8, 2018, 14 pages (with English Translation).

Extended European Search Report in European Application No. 17884001.3, dated Nov. 15, 2019, 7 pages.

* cited by examiner

METHOD, SYSTEM AND APPARATUS FOR MANAGING PRIMARY AND SECONDARY DATABASES

CROSS-REFERENCE TO RELATED APPLICATIONS

This application is a continuation of PCT Application No. PCT/CN2017/115392, filed on Dec. 11, 2017, which claims priority to Chinese Patent Application No. 201611183638.9, filed on Dec. 20, 2016, and each application is hereby incorporated by reference in its entirety.

TECHNICAL FIELD

The present application relates to the field of information security technologies, and in particular, to a method, system and apparatus for managing primary and secondary databases.

BACKGROUND

Databases are key infrastructures in the fields such as finance, commerce, transportation, and even the entire society. Continuous availability of the database can ensure that services can be continuously provided for a user in the fields such as financial and commercial fields. To prevent a single database from being faulty and improve database availability, a primary database and a secondary database are usually configured. When the primary database is faulty, the primary database is switched to a secondary database to continue to serve the user.

In related technologies, switching between primary and secondary databases can be automatic. That is, a monitoring system is deployed for the primary database, and once finding that the primary database is abnormal, the monitoring system sends an alarm and a command for switching between primary and secondary databases.

However, in the previous method for switching between primary and secondary databases, the following case may occur due to incorrect judgment: The primary database is switched when the primary database is not faulty, or the primary database is faulty but is not switched. Consequently, normal services provided for the user are affected.

SUMMARY

The present application intends to alleviate one of the previous technical problems at least to some extent.

Therefore, a first objective of the present application is to provide a method for managing primary and secondary databases. According to the method, if a primary database does not send a lock renewal request before a lock held by the primary database expires, it is determined that the lock held by the primary database is invalid and the primary database cannot normally serve a user, so that a secondary database is selected as a new primary database, thereby improving a speed and accuracy of switching between primary and secondary databases.

A second objective of the present application is to provide a lock arbitration server.

A third objective of the present application is to provide a primary database server.

A fourth objective of the present application is to provide a secondary database server.

A fifth objective of the present application is to provide a system for managing primary and secondary databases.

To achieve the previous objective, a method for managing primary and secondary databases in an implementation of a first aspect of the present application includes: determining whether a lock held by a primary database expires, where the primary database and secondary databases share the lock; if determining that the lock held by the primary database has expired, determining whether a lock renewal request of the primary database is received; and if the lock renewal request of the primary database is not received, selecting one of the secondary databases as a new primary database, and controlling the primary database to be switched to a secondary database.

According to the method for managing primary and secondary databases in this implementation of the present application, it is determined whether the lock held by the primary database expires. If it is determined that the lock held by the primary database has expired, it is determined whether the lock renewal request of the primary database is received. If the lock renewal request is not received, one of the secondary databases is selected as a new primary database, and the primary database is controlled to be switched to a secondary database. According to the method, if the primary database does not send the lock renewal request before the lock held by the primary database expires, it is determined that the lock held by the primary database is invalid and the primary database cannot normally serve a user, so that a secondary database is selected as a new primary database, thereby improving a speed and accuracy of switching between primary and secondary databases.

In addition, the method for managing primary and secondary databases in this implementation of the present application further has the following additional technical features:

In an implementation of the present application, after the determining that the lock held by the primary database has expired, the method further includes: sending a lock expiration notification to the secondary database; and receiving a lock request sent by the secondary database based on the lock expiration notification, and recording a receiving time of the lock request.

In an implementation of the present application, the selecting one of the secondary databases as a primary database further includes: selecting, as the primary database, a secondary database with the earliest receiving time.

In an implementation of the present application, a priority of the primary database is higher than a priority of the secondary database.

In an implementation of the present application, an update cycle of the lock is T1, the primary database sends, at a cycle T2, a lock request for querying a status of the lock, and the secondary database sends, at a cycle T3, a lock request for querying the status of the lock, where T2 is less than T1, and T3 is greater than or equal to T1.

In an implementation of the present application, the secondary database includes a hot standby database and a disaster recovery database, the primary database and the hot standby database are located in a same data center, and the primary database and the disaster recovery database are located in different data centers.

In an implementation of the present application, after the original primary database is restored, the method further includes: receiving a lock request sent by the original primary database, and controlling the lock to be held by the original primary database after the lock expires, so that the original primary database is restored to a primary database, and the current primary database is restored to a secondary database.

In an implementation of the present application, after the selecting one of the secondary databases as a new primary database, the method further includes: continuing to determine whether a lock held by the current primary database expires; if the lock held by the current primary database has expired, determining whether lock requests of the original primary database, the current primary database, and other secondary databases are received; and if the lock request of the original primary database is received, restoring the original primary database to a primary database, and restoring the current primary database to a secondary database; or if the lock request of the original primary database is not received and the lock requests of the current primary database and the other secondary databases are received, maintaining the current primary database as a primary database; or if the lock requests of the original primary database and the current primary database are not received and the lock requests of the other secondary databases are received, selecting one of the other secondary databases as a primary database, and restoring the current primary database to a secondary database.

To achieve the previous objective, a lock arbitration server in an implementation of a second aspect of the present application includes: a first determining module, configured to determine whether a lock held by a primary database expires, where the primary database and secondary databases share the lock; a second determining module, configured to: when the lock held by the primary database has expired, determine whether a lock renewal request of the primary database is received; and a first processing module, configured to: when the lock renewal request of the primary database is not received, select one of the secondary databases as a new primary database, and control the primary database to be switched to a secondary database.

The lock arbitration server in this implementation of the present application determines whether the lock held by the primary database expires. If determining that the lock held by the primary database has expired, the server determines whether the lock renewal request of the primary database is received. If the lock renewal request is not received, the server selects one of the secondary databases as a new primary database, and controls the primary database to be switched to a secondary database. If the primary database does not send the lock renewal request before the lock held by the primary database expires, the server determines that the lock held by the primary database is invalid and the primary database cannot normally serve a user, so that a secondary database is selected as a new primary database, thereby improving a speed and accuracy of switching between primary and secondary databases.

In addition, the lock arbitration server in this implementation of the present application has the following additional technical features:

In an implementation of the present application, the first processing module is configured to select, as the primary database, a secondary database with the earliest receiving time.

In an implementation of the present application, a priority of the primary database is higher than a priority of the secondary database.

In an implementation of the present application, an update cycle of the lock is T1, the primary database sends, at a cycle T2, a lock request for querying a status of the lock, and the secondary database sends, at a cycle T3, a lock request for querying the status of the lock, where T2 is less than T1, and T3 is greater than or equal to T1.

In an implementation of the present application, the secondary database includes a hot standby database and a disaster recovery database, the primary database and the hot standby database are located in a same data center, and the primary database and the disaster recovery database are located in different data centers.

In an implementation of the present application, the lock arbitration server further includes a first receiving module, configured to: after the original primary database is restored, receive a lock request sent by the original primary database, where the first processing module is further configured to control the lock to be held by the original primary database after the lock expires, so that the original primary database is restored to a primary database, and the current primary database is restored to a secondary database.

In an implementation of the present application, the first determining module is further configured to continue to determine whether a lock held by current primary database expires; the second determining module is further configured to: when the lock held by the current primary database has expired, determine whether lock requests of the original primary database, the current primary database, and other secondary databases are received; a second processing module is configured to: when the lock request of the original primary database is received, restore the original primary database to a primary database, and restore the current primary database to a secondary database; a third processing module is configured to: when the lock request of the original primary database is not received and the lock requests of the current primary database and the other secondary databases are received, maintain the current primary database as a primary database; and a fourth processing module is configured to: when the lock requests of the original primary database and the current primary database are not received and the lock requests of the other secondary databases are received, select one of the other secondary databases as a primary database, and restore the current primary database to a secondary database.

To achieve the previous purpose, a primary database server in an implementation of a third aspect of the present application includes: a second sending module, configured to send a lock renewal request to a lock arbitration server when a lock held by a primary database expires, so that the lock arbitration server selects one of secondary databases as a new primary database when the lock arbitration server does not receives the lock renewal request; and a switching module, configured to control the primary database to be switched to a secondary database.

When the lock held by the primary database expires, the primary database server in this implementation of the present application sends the lock renewal request to the lock arbitration server, so that the lock arbitration server selects one of the secondary databases as a new primary database when the lock arbitration server does not receives the lock renewal request; and switches the primary database to a secondary database. When a validity period of the lock held by the primary database cannot be extended, the primary database server switches the primary database to a secondary database, and a secondary database is selected as a new primary database, thereby improving a speed and accuracy of switching between primary and secondary databases, ensuring that the database normally serves a user, and improving user experience.

In addition, the primary database server in this implementation of the present application has the following additional technical features:

In an implementation of the present application, a priority of the primary database is higher than a priority of the secondary database.

In an implementation of the present application, an update cycle of the lock is T1, the primary database server sends, at a cycle T2, a lock request for querying a status of the lock, and the secondary database sends, at a cycle T3, a lock request for querying the status of the lock, where T2 is less than T1, and T3 is greater than or equal to T1.

In an implementation of the present application, the secondary database includes a hot standby database and a disaster recovery database, the primary database and the hot standby database are located in a same data center, and the primary database and the disaster recovery database are located in different data centers.

In an implementation of the present application, the primary database server further includes: a third sending module, configured to: after the original primary database is restored, send a lock request to the lock arbitration server, so that the lock arbitration server receives the lock request sent by the original primary database, and controls the lock to be held by the original primary database after the lock expires, so that the original primary database is restored to a primary database, and the current primary database is restored to a secondary database.

To achieve the previous objective, a secondary database server in an implementation of a fourth aspect of the present application includes: a fourth sending module, configured to send a lock request to a lock arbitration server; a second receiving module, configured to receive a lock acknowledgement message sent by the lock arbitration server; and a fifth processing module, configured to switch a secondary database to a new primary database based on the lock acknowledgement message.

The secondary database server in this implementation sends the lock request to the lock arbitration server, receives a lock acknowledgement message sent by the lock arbitration server, and switches a secondary database to a new primary database based on the lock acknowledgement message. When a primary database cannot extend a validity period of a lock held by the primary database, the secondary database server selects a secondary database as a new primary database, and the primary database is switched to a secondary database, thereby improving a speed and accuracy of switching between primary and secondary databases, ensuring that the database normally serves a user, and improving user experience.

The secondary database server in this implementation of the present application has the following additional technical features:

In an implementation of the present application, the secondary database server includes: a third receiving module, configured to receive a lock expiration notification sent by the lock arbitration server after the lock arbitration server determines that a lock held by a primary database has expired, where the fourth sending module sends the lock request to the lock arbitration server based on the lock expiration notification.

In an implementation of the present application, a priority of the primary database is higher than a priority of the secondary database.

In an implementation of the present application, the secondary database includes a hot standby database and a disaster recovery database, the primary database and the hot standby database are located in a same data center, and the primary database and the disaster recovery database are located in different data centers.

In an implementation of the present application, the secondary database server further includes: a sixth processing module, configured to control the current primary database to be restored to a secondary database after the lock arbitration server receives a lock request sent by the original primary database, and controls the lock to be held by the original primary database after the lock expires, so that the original primary database is restored to a primary database.

To achieve the previous purpose, a system for managing primary and secondary databases in an implementation of a fifth aspect of the present application includes the lock arbitration server in the implementation of the second aspect of the present application, the primary database server in the implementation of the third aspect of the present application, and the secondary database server in the implementation of the fourth aspect of the present application.

Some additional aspects and advantages of the present application are provided in the following descriptions, and are apparent in the following descriptions or understandable through practice of the present application.

BRIEF DESCRIPTION OF DRAWINGS

The previous and/or additional aspects and advantages of the present application are apparent and comprehensible in the following descriptions of implementations with reference to the accompanying drawings.

DESCRIPTION OF IMPLEMENTATIONS

Figure 1:
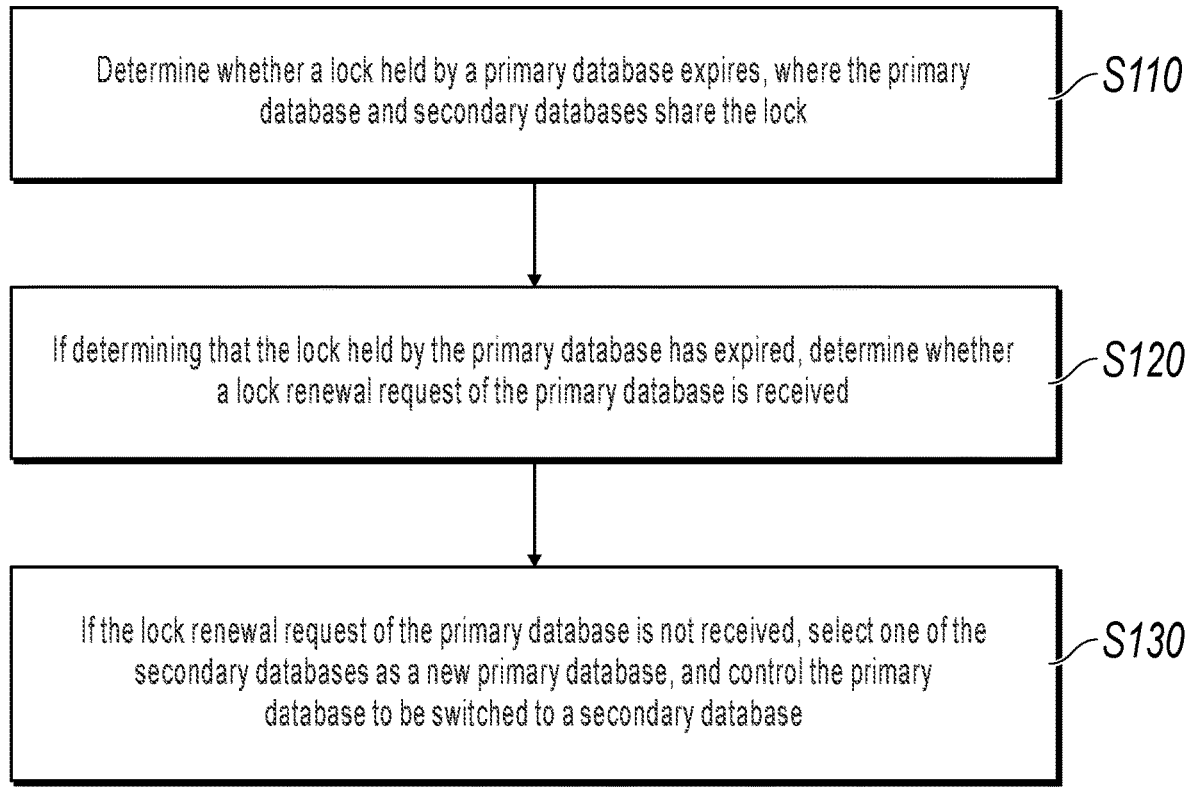
FIG. 1 is a flowchart illustrating a method for managing primary and secondary databases, according to an implementation of the present application.

The implementations of the present application are described in detail below, and examples of the implementations are shown in the accompanying drawings. The same or similar reference numerals represent the same or similar elements or elements having the same or similar functions. The implementations described below with reference to the accompanying drawings are examples, are intended to explain the present application, and should not be construed as a limitation on the present application.

With reference to the accompanying drawings, the following describes a method, system and apparatus for managing primary and secondary databases according to an implementation of the present application.

FIG. 1 is a flowchart illustrating a method for managing primary and secondary databases, according to an implementation of the present application. As shown in FIG. 1, the method for managing primary and secondary databases includes the steps below.

S110. Determine whether a lock held by a primary database expires, where the primary database and secondary databases share the lock.

S120. If determining that the lock held by the primary database has expired, determine whether a lock renewal request of the primary database is received.

It can be understood that, incorrect switching between primary and secondary databases may occur when a monitoring system monitors and controls switching between primary and secondary databases, for example, a primary database that is not faulty is switched or a primary database is faulty but is not switched. To alleviate the problem, in the method for managing primary and secondary databases in this implementation of the present application, an external arbitration mechanism is introduced and is used to accurately determine whether the primary database is faulty, thereby accurately controlling switching between primary and secondary databases.

There can be a plurality of external arbitration mechanisms based on different specific application scenarios. In this implementation of the present application, an example that the arbitration mechanism is a lock service is used for detailed description.

Specifically, the primary database and the secondary databases share a lock. Both the primary database and the secondary databases contend for ownership of the lock, and a database that obtains the lock is a primary database. In addition, because the lock has a mutual exclusion feature, only one database can be a primary database at the same time.

The primary database needs to continuously update the lock to extend a validity period (usually tens of seconds) of the lock before the validity period expires. If the primary database is faulty or is performing an upgrade or maintenance operation within the validity period, the primary database cannot complete updating the lock to extend the validity period of the lock. Therefore, another secondary database seizes the lock and is upgraded to a primary database, and the primary database is downgraded to a secondary database.

Specifically, in actual applications, to keep the primary database unchanged, that is, to prevent the primary database from being switched to a secondary database when the primary database is not faulty or performs an upgrade or maintenance operation, a priority of the primary database is higher than a priority of the secondary database, thereby ensuring that a database that holds the lock is the primary database when the primary database is not faulty or performs an upgrade or maintenance operation.

It is worthwhile to note that, there are a plurality of methods for deploying primary and secondary databases, for example, a method for deploying one primary database and one secondary database, or a method for deploying one primary database and a plurality of secondary databases.

For ease of description, this implementation of the present application is described by using an example that the method for deploying primary and secondary databases is a three-data-centers-in-two-locations method. That is, the secondary database includes a hot standby database and a disaster recovery database, the primary database and the hot standby database are located in the same data center, and the primary database and the disaster recovery database are located in different data centers.

Further, to determine whether the primary database that holds the lock is faulty, it is determined whether the primary database extends the validity period of the lock within the validity period.

Specifically, it is determined whether the lock held by the primary database expires. If it is determined that the lock held by the primary database has expired, it is determined whether the lock renewal request of the primary database is received.

S130. If the lock renewal request of the primary database is not received, select one of the secondary databases as a new primary database, and control the primary database to be switched to a secondary database.

Specifically, if the lock renewal request of the primary database is not received, it indicates that the primary database has a network failure or a power failure and cannot complete updating the lock. Therefore, to normally serve a user, one of the secondary databases is selected as a new primary database, and the primary database is controlled to be switched to a secondary database.

It is worthwhile to note that, one of the secondary databases can be selected as a primary database by using different methods based on different specific application scenarios. For example, the secondary database can actively query, at a specific cycle, whether the primary database sends the lock renewal request when the lock of the primary database expires, to extend the validity period of the lock. If no, the secondary database sends a lock request, to quickly obtain the lock and switch to a primary database.

To describe the method for managing primary and secondary databases in this implementation of the present application more clearly, with reference to FIG. 2 (*a*) to FIG. 2 (*b*), an example that a database deployment method is a three-data-centers-in-two-locations method is used below for description. That is, as shown in FIG. 2 (*a*), two databases (the primary database and the hot standby database) are deployed in a local primary equipment room and a local hot standby equipment room, and one independent database (the disaster recovery database) is deployed in a remote disaster recovery equipment room.

In this example, the external arbitration mechanism service GOS can be deployed across areas, can tolerate a complete failure of an equipment room and a layout area or a network failure, and can always provide an uninterrupted lock service.

Figure 2A:
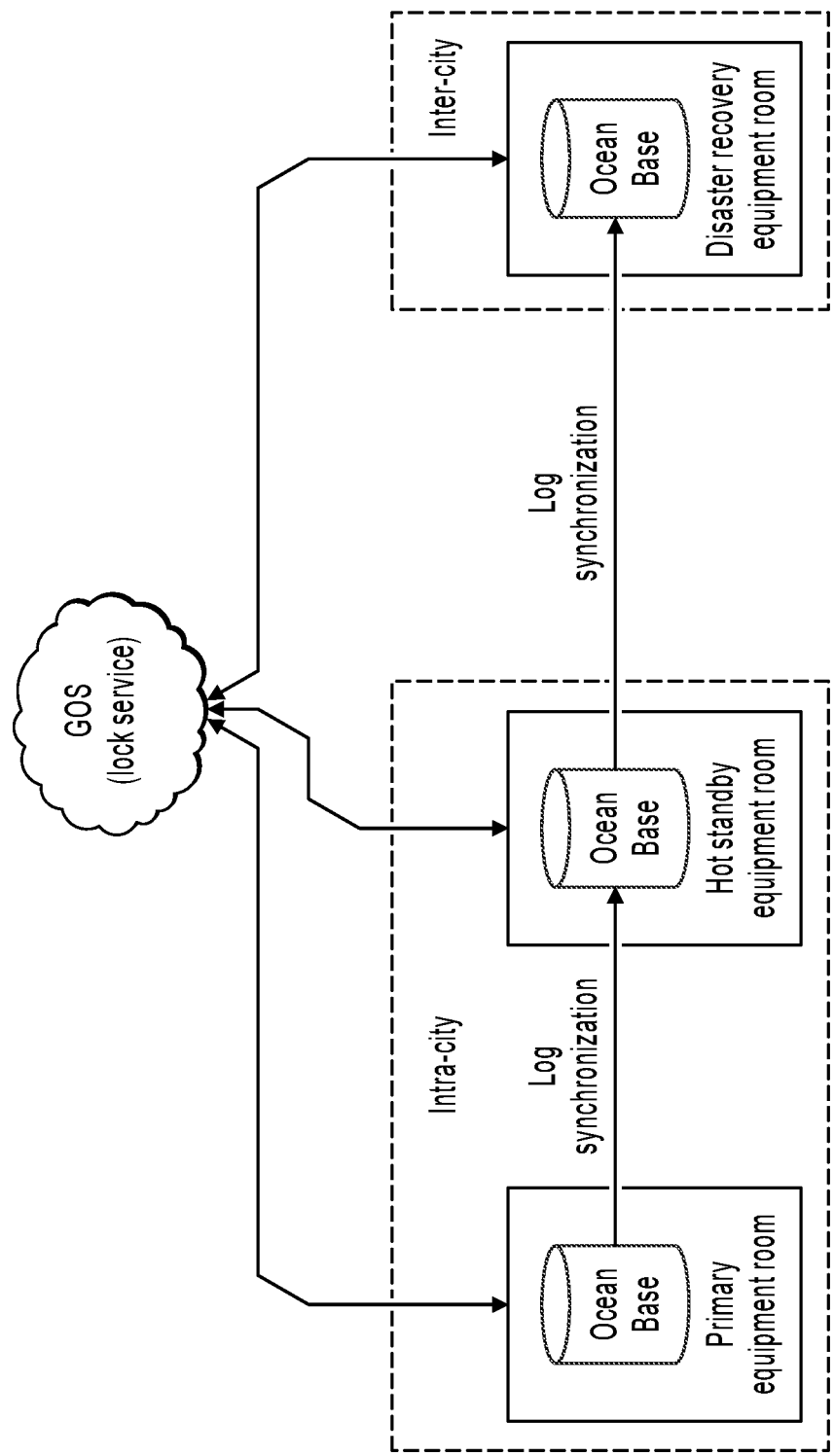
FIG. 2 (*a*) to FIG. 2 (*c*) are diagrams illustrating primary and secondary database deployment, according to a specific implementation of the present application.
Figure 2B:
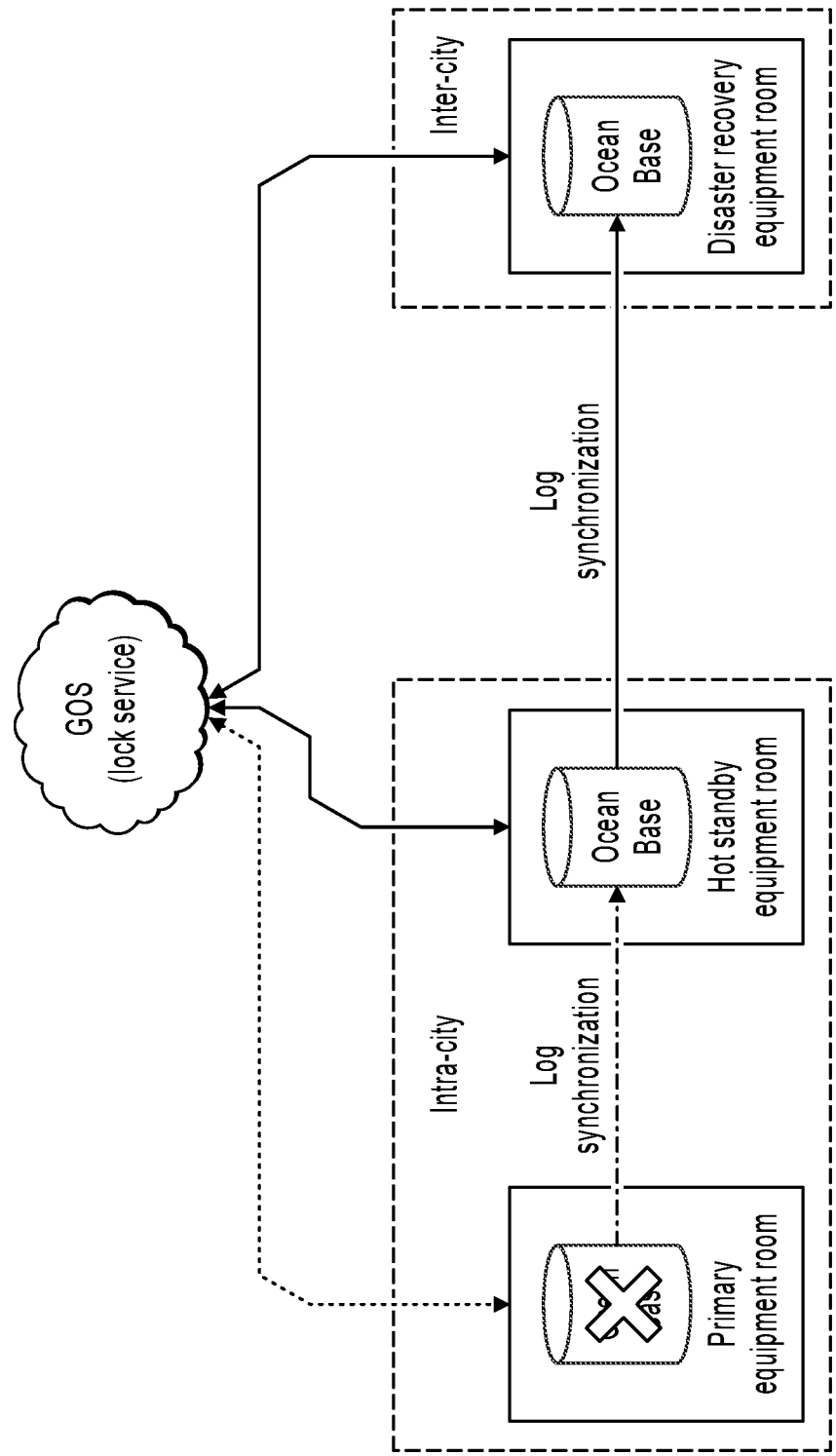
Figure 2C:
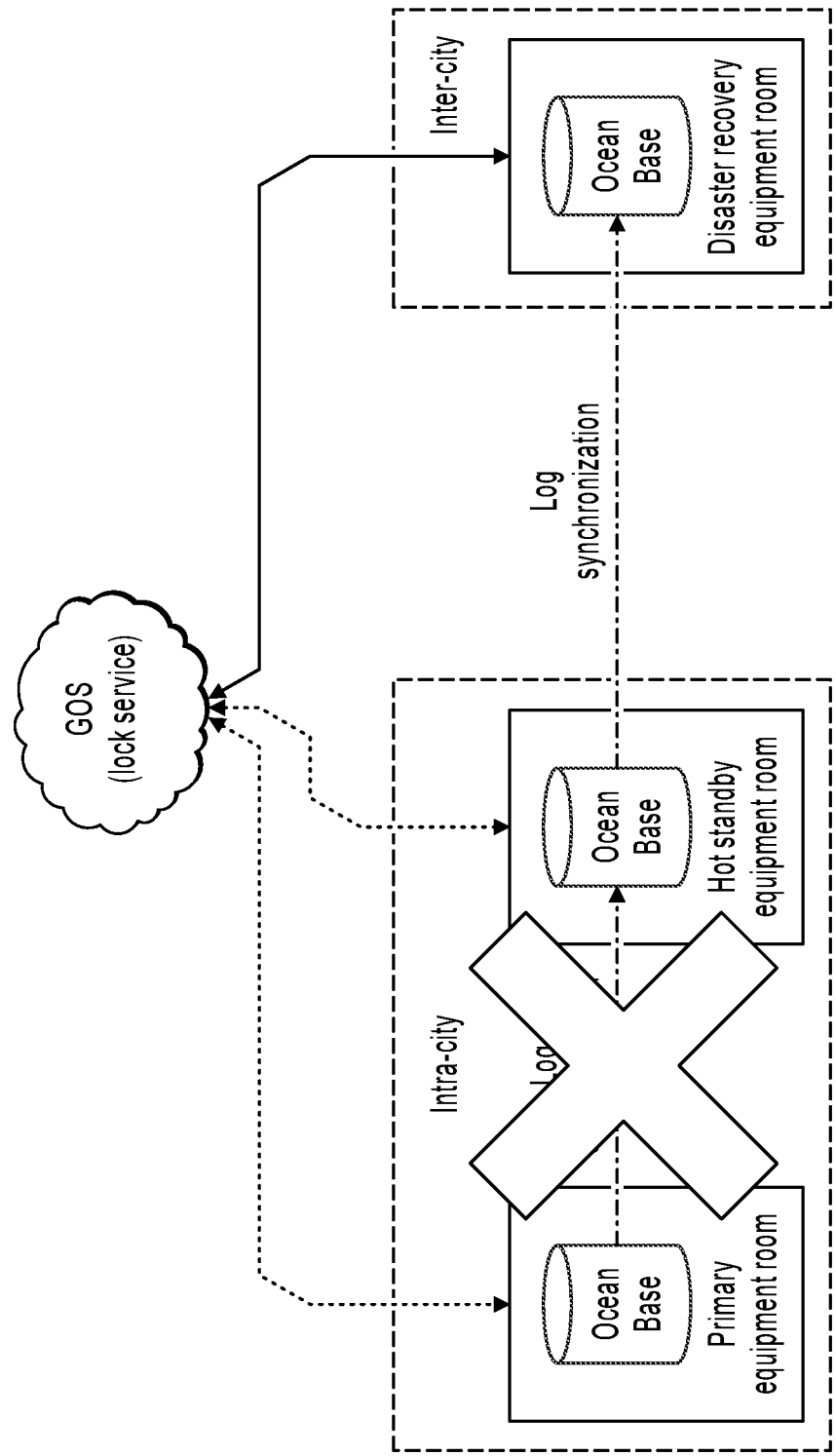

FIG. 2 (b) is a schematic diagram illustrating switching between primary and secondary databases, according to an implementation of the present application.

As shown in FIG. 2 (b), if the primary equipment room is entirely faulty, for example, if the primary equipment room is damaged or a network is faulty, the primary database cannot send the lock renewal request, and therefore cannot extend the validity period of the lock held by the primary database. Consequently, the lock held by the primary database is invalid. This process usually lasts for several tens of seconds. In this period, the primary database cannot normally serve the user.

After the validity period of the lock expires, the hot standby equipment room usually gets a new lock, so that the hot standby database becomes a new primary database. The original primary database is automatically downgraded to a secondary database, and the hot standby database serves the user as a new primary database. The disaster recovery equipment room obtains the latest data from the new primary database and locally synchronizes the data.

In conclusion, according to the method for managing primary and secondary databases in this implementation of the present application, it is determined whether the lock held by the primary database expires. If it is determined that the lock held by the primary database has expired, it is determined whether the lock renewal request of the primary database is received. If the lock renewal request is not received, one of the secondary databases is selected as a new primary database, and the primary database is controlled to be switched to a secondary database. According to the method, if the primary database does not send the lock renewal request before the lock held by the primary database expires, it is determined that the lock held by the primary database is invalid and the primary database cannot normally serve the user, so that a secondary database is selected as a new primary database, thereby improving a speed and accuracy of switching between primary and secondary databases.

Based on the previous implementation, in the method for managing primary and secondary databases, a method for switching between primary and secondary databases can fall into two types: active switching and passive switching, and detailed descriptions are as follows:

For example, to enable the primary database to update the lock in a timely manner and to enable other secondary databases to quickly obtain the lock when the primary database is faulty, the primary database can send, at a relatively short cycle within an update cycle of the lock, a request for querying a status of the lock, to update the lock in a timely manner when the lock is close to expiring and keep the primary database unchanged.

In addition, the secondary database actively sends, at a relatively long cycle, a lock request for querying the status of the lock. Therefore, when the lock of the primary database is invalid, the secondary database can quickly obtain the lock and actively switch to a new primary database, so that services provided for the user are not affected.

For example, the update cycle of the lock is T1, the primary database sends, at a cycle T2, a lock request for querying the status of the lock, and the secondary database sends, at a cycle T3, a lock request for querying the status of the lock, where T2 is less than T1, and T3 is greater than or equal to T1.

For another example, if the secondary database does not always actively send, at a specific cycle, a lock request for querying a status of the lock, when the lock held by the primary database is invalid, a lock expiration notification is actively sent to each of other secondary databases, so that the secondary database sends the lock request based on the lock expiration notification, obtains the lock, and becomes a new primary database.

Figure 3:
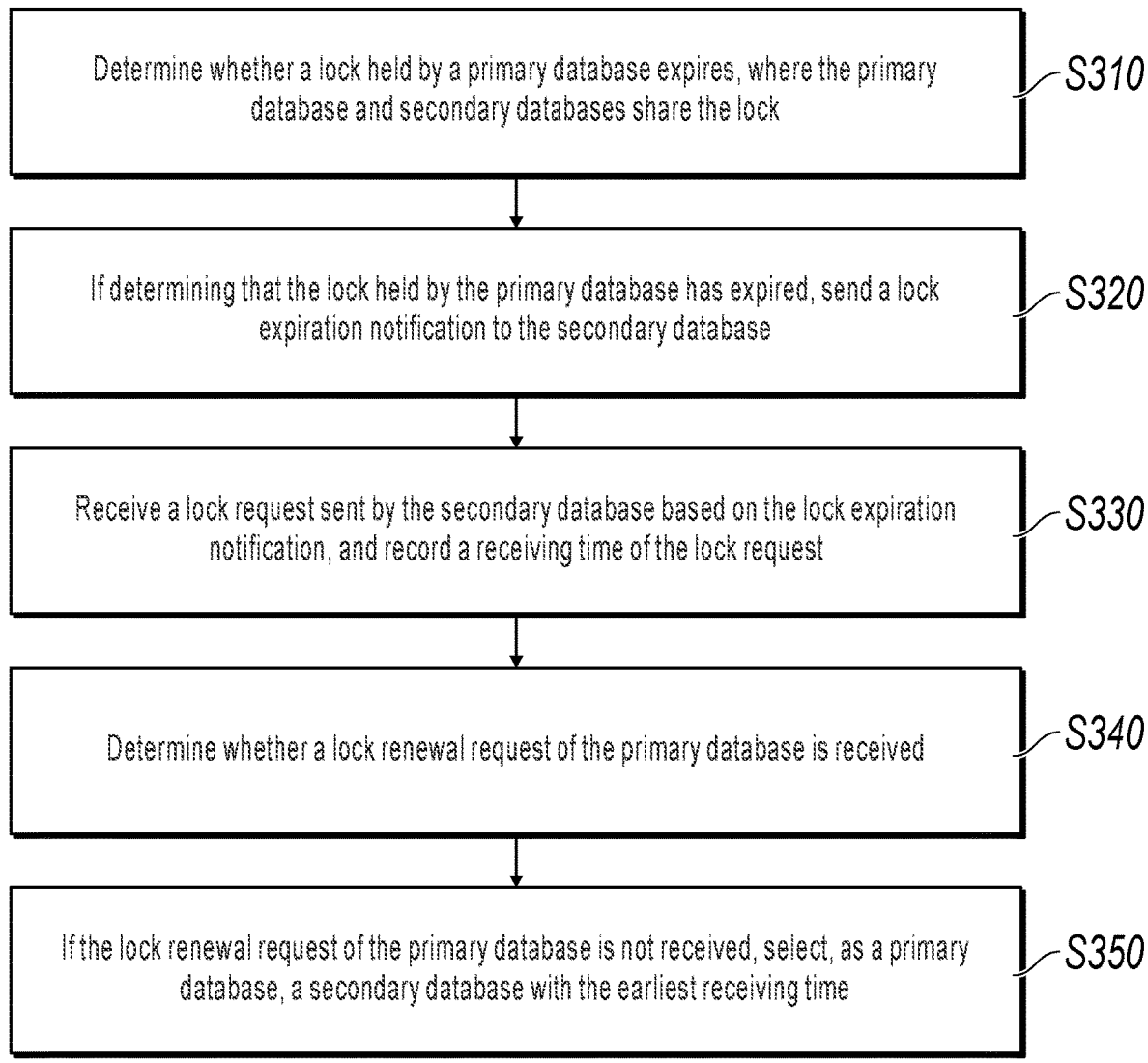
FIG. 3 is a flowchart illustrating a method for managing primary and secondary databases, according to another implementation of the present application.

Specifically, FIG. 3 is a flowchart illustrating a method for managing primary and secondary databases, according to another implementation of the present application. As shown in FIG. 3, the method includes the steps below.

S310. Determine whether a lock held by a primary database expires, where the primary database and secondary databases share the lock.

S320. If determining that the lock held by the primary database has expired, send a lock expiration notification to the secondary database.

S330. Receive a lock request sent by the secondary database based on the lock expiration notification, and record a receiving time of the lock request.

S340. Determine whether a lock renewal request of the primary database is received.

S350. If the lock renewal request of the primary database is not received, select, as a primary database, a secondary database with the earliest receiving time.

It can be understood that data is synchronized in real time between the primary database and the secondary database. A synchronization speed depends on a backup speed of the database. Generally, a delay of an intra-city equipment room is several milliseconds, and a delay of a remote equipment room is hundreds of milliseconds.

In addition, if the primary database actively initiates switching, for example, performs version upgrade or offline maintenance, data write can be stopped before the primary database gives up an identity of the primary database. A hot standby equipment room obtains the lock, and a hot standby database can synchronize and complete updating all the data. Therefore, generally, data in the hot standby database is relatively complete, so that the hot standby database is preferably used as a next primary database.

Specifically, a secondary database closer to the primary database is determined based on the receiving time of the lock request. That is, distances between the primary database and different secondary databases can be different. For example, a hot standby database is usually closer to the primary database, and a disaster recovery database is usually farther from the primary database. Therefore, receiving times of lock requests of the two databases are different, and the receiving time of the request of the hot standby database is earlier.

Further, if the lock renewal request of the primary database is not received, it indicates that the current database is faulty or is performing an upgrade or maintenance operation. Therefore, to normally serve a user as soon as possible, a secondary database with the earliest receiving time is selected as a primary database.

In addition, it should be understood that when the primary database and the hot standby database that are located in the same data center are faulty due to a disaster such as an earthquake, the method for managing primary and secondary databases in this implementation of the present application can still be implemented.

As shown in FIG. 2 (c), when equipment rooms of the primary database and the hot standby database are both faulty, the lock of the primary database becomes invalid, and the hot standby database cannot obtain the lock. Therefore, the disaster recovery database obtains the lock and becomes a new primary database, and continues to serve the user. The entire process does not require manual participation.

In conclusion, according to the method for managing primary and secondary databases in this implementation of the present application, when the lock of the primary database expires and is invalid, the secondary database quickly obtains the lock and becomes a new primary database, thereby ensuring that normal services are still provided for the user in a relatively short time, and improving user experience.

In actual applications, after related operations such as maintenance and upgrade are performed on the faulty original primary database, the original primary database can continue to serve the user. Therefore, the method for managing primary and secondary databases in this implementation of the present application further includes: receiving a lock request from the original primary database after the original primary database is restored, to switch the original primary database to a primary database.

Specifically, in this example, after one of the secondary databases is selected as a new primary database, validity of a lock of the current primary database and the lock request of the original primary database are always detected. When the lock of the current primary database is invalid, one of other secondary databases is selected as a new primary database again. Alternatively, after the lock request of the original primary database is received, because a priority of the original primary database is higher, the original primary database is switched to a primary database, and the current primary database is downgraded to a secondary database.

Figure 4:
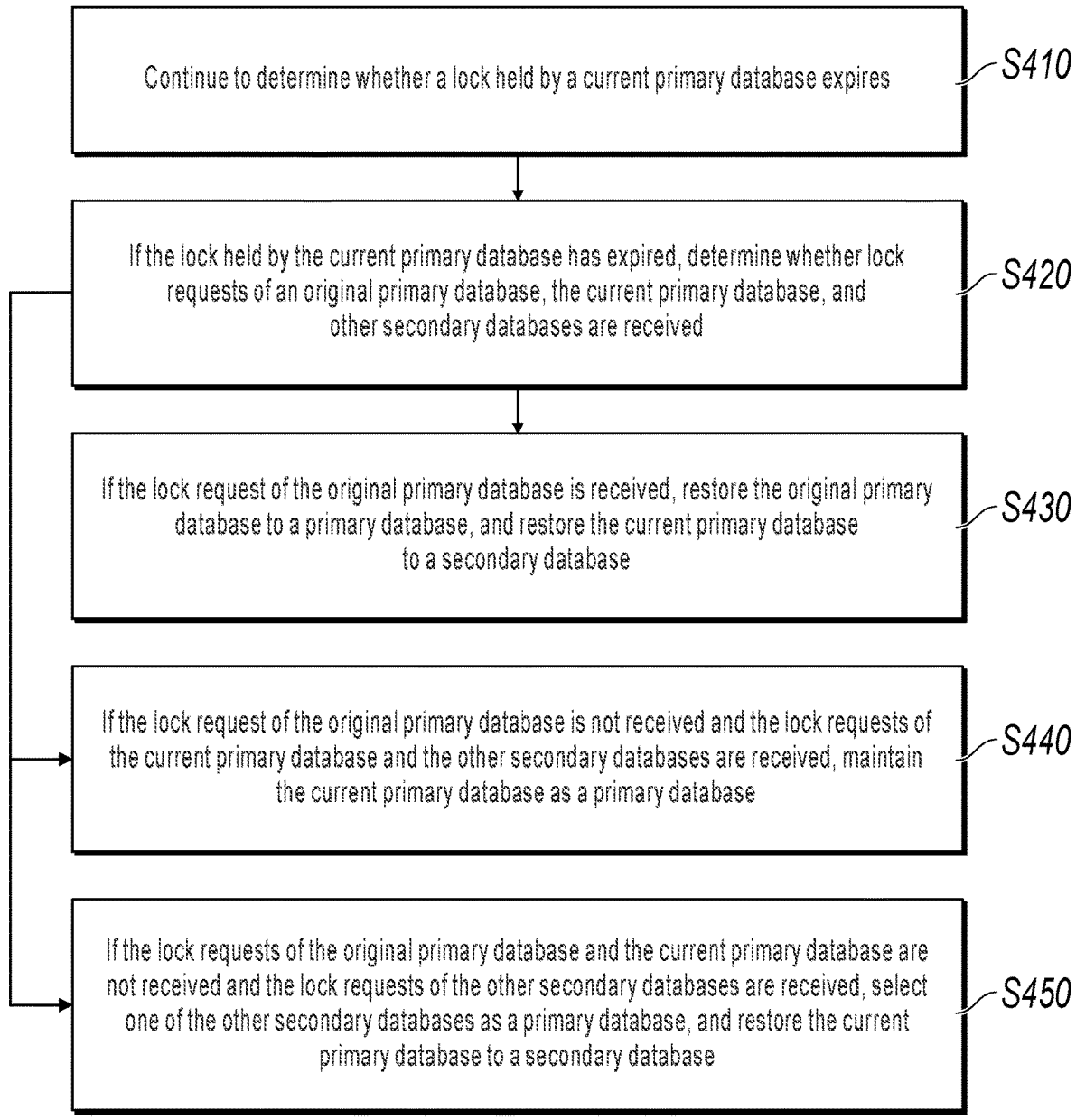
FIG. 4 is a flowchart illustrating a method for managing primary and secondary databases, according to still another implementation of the present application.

FIG. 4 is a flowchart illustrating a method for managing primary and secondary databases, according to still another implementation of the present application. As shown in FIG. 4, the method for managing primary and secondary databases includes the steps below.

S410. Continue to determine whether a lock held by a current primary database expires.

S420. If the lock held by the current primary database has expired, determine whether lock requests of an original primary database, the current primary database, and other secondary databases are received.

S430. If the lock request of the original primary database is received, restore the original primary database to a primary database, and restore the current primary database to a secondary database.

Specifically, after the original primary database is restored, the original primary database sends the lock request. Because a priority of the original primary database is higher, after the lock request is received, the original primary database is restored to a primary database, and the current primary database is restored to a secondary database.

S440. If the lock request of the original primary database is not received and the lock requests of the current primary database and the other secondary databases are received, maintain the current primary database as a primary database.

Specifically, when the lock request of the original primary database is not received and the current primary database normally updates the lock, the current primary database is maintained as a primary database.

S450. If the lock requests of the original primary database and the current primary database are not received and the lock requests of the other secondary databases are received, select one of the other secondary databases as a primary database, and restore the current primary database to a secondary database.

Specifically, if the lock requests of the original primary database and the current primary database are not received, it indicates that the original primary database is not restored, and the current primary database is also faulty or needs to perform an upgrade operation. Therefore, to normally serve a user, one of the other secondary databases that send the lock requests needs to be selected as a primary database, and the current primary database is restored to a secondary database.

In conclusion, according to the method for managing primary and secondary databases in this implementation of the present application, after selecting one of the secondary databases as a new primary database, a lock arbitration server continues to determine whether the current primary database receives the lock request of the original primary database and whether the current primary database updates the lock. When the lock request of the original primary database is received, the server restores the original primary database to a primary database, and restores the current primary database to a secondary database. If the lock request of the original primary database is not received, the server determines whether the current primary database updates the lock within a validity period. If no, the server selects one of the other secondary databases as a primary database, and restores the current primary database to a secondary database. According to the method, it is ensured that the original primary database is restored to a primary database after the original primary database is restored, to better serve the user, thereby improving practicality of the method for managing primary and secondary databases in the present application.

Figure 5:
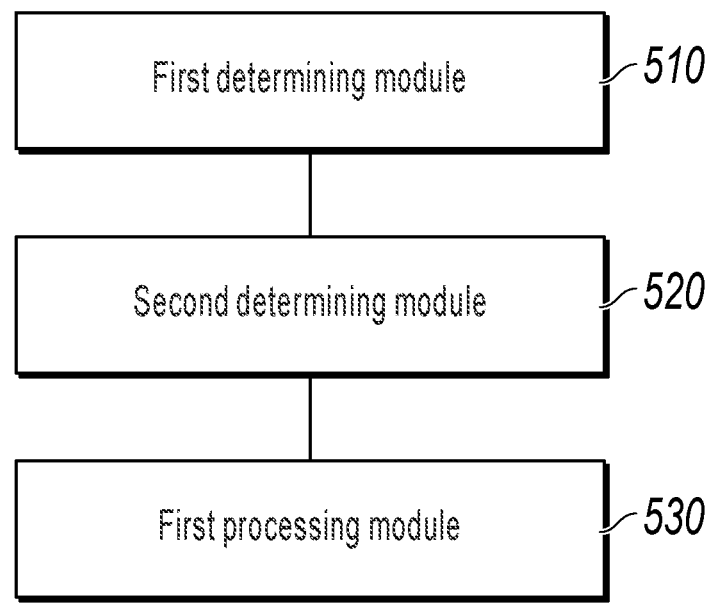
FIG. 5 is a schematic structural diagram illustrating a lock arbitration server, according to an implementation of the present application.

To implement the previous implementation, the present application further provides a lock arbitration server. FIG. 5 is a schematic structural diagram illustrating a lock arbitration server, according to an implementation of the present application.

As shown in FIG. 5, the lock arbitration server includes: a first determining module 510, configured to determine whether a lock held by a primary database expires, where the primary database and secondary databases share the lock; a second determining module 520, configured to: when the lock held by the primary database has expired, determine whether a lock renewal request of the primary database is received; and a first processing module 530, configured to: when the lock renewal request of the primary database is not received, select one of the secondary databases as a new primary database, and control the primary database to be switched to a secondary database.

Specifically, in actual applications, to keep the primary database unchanged, that is, to prevent the primary database from being switched to a secondary database when the primary database is not faulty or performs an upgrade or maintenance operation, a priority of the primary database is higher than a priority of the secondary database, thereby ensuring that a database that holds the lock is the primary database when the primary database is not faulty or performs an upgrade or maintenance operation.

It is worthwhile to note that, there are a plurality of methods for deploying primary and secondary databases, for example, a method for deploying one primary database and one secondary database, or a method for deploying one primary database and a plurality of secondary databases.

For ease of description, this implementation of the present application is described by using an example that the method for deploying primary and secondary databases is a three-data-centers-in-two-locations method. That is, the secondary database includes a hot standby database and a disaster recovery database, the primary database and the hot standby database are located in the same data center, and the primary database and the disaster recovery database are located in different data centers.

Further, to determine whether the primary database that holds the lock is faulty, it is determined whether the primary database extends the validity period of the lock within the validity period.

Specifically, the first determining module 510 determines whether the lock held by the primary database expires. If it is determined that the lock held by the primary database has expired, the second determining module 520 determines whether the lock renewal request of the primary database is received.

Further, if the lock renewal request of the primary database is not received, it indicates that the primary database has a network failure or a power failure and cannot complete updating the lock. Therefore, to normally serve a user, the first processing module 530 selects one of the secondary databases as a new primary database, and controls the primary database to be switched to a secondary database.

It is worthwhile to note that, the first processing module 530 can select one of the secondary databases as a primary database by using different methods based on different specific application scenarios. For example, the secondary database can actively query, at a specific cycle, whether the primary database sends the lock renewal request when the lock of the primary database expires, to extend the validity period of the lock. If no, the secondary database sends a lock request, to quickly obtain the lock and switch to a primary database.

In conclusion, the lock arbitration server in this implementation of the present application determines whether the lock held by the primary database expires. If determining that the lock held by the primary database has expired, the server determines whether the lock renewal request of the primary database is received. If the lock renewal request is not received, the server selects one of the secondary databases as a new primary database, and controls the primary database to be switched to a secondary database. If the primary database does not send the lock renewal request before the lock held by the primary database expires, the lock arbitration server determines that the lock held by the primary database is invalid and the primary database cannot normally serve the user, so that a secondary database is selected as a new primary database, thereby improving a speed and accuracy of switching between primary and secondary databases.

Based on the previous implementation, in the method for managing primary and secondary databases, a method for switching between primary and secondary databases can fall into two types: active switching and passive switching, and detailed descriptions are as follows:

For example, to enable the primary database to update the lock in a timely manner and to enable other secondary databases to quickly obtain the lock when the primary database is faulty, the primary database can send, at a relatively short cycle within an update cycle of the lock, a request for querying a status of the lock, to update the lock in a timely manner when the lock is close to expiring and keep the primary database unchanged.

In addition, the secondary database actively sends, at a relatively long cycle, a lock request for querying the status of the lock. Therefore, when the lock of the primary database is invalid, the secondary database can quickly obtain the lock and actively switch to a new primary database, so that services provided for the user are not affected.

For example, the update cycle of the lock is T1, the primary database sends, at a cycle T2, a lock request for querying the status of the lock, and the secondary database sends, at a cycle T3, a lock request for querying the status of the lock, where T2 is less than T1, and T3 is greater than or equal to T1.

For another example, if the secondary database does not always actively send, at a specific cycle, a lock request for querying a status of the lock, when the lock held by the primary database is invalid, a lock expiration notification is actively sent to each of other secondary databases, so that the secondary database sends the lock request based on the lock expiration notification, obtains the lock, and becomes a new primary database.

Figure 6:
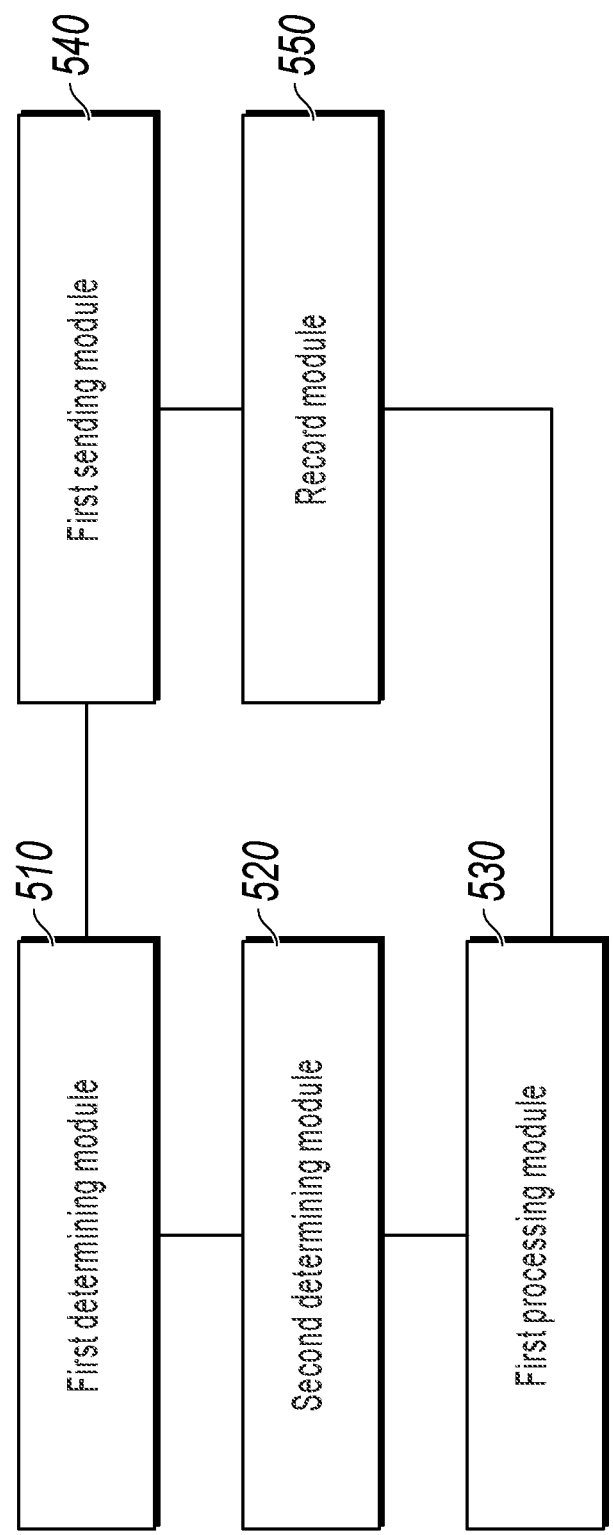
FIG. 6 is a schematic structural diagram illustrating a lock arbitration server, according to a specific implementation of the present application.

Specifically, FIG. 6 is a schematic structural diagram illustrating a lock arbitration server, according to a specific implementation of the present application. As shown in FIG. 6, on the basis of FIG. 5, the lock arbitration server further includes a first sending module 540 and a record module 550.

Specifically, the first sending module sends a lock expiration notification to the secondary database after the first determining module 510 determines that the lock held by the primary database has expired. Then, the record module 550 receives a lock request sent by the secondary database based on the lock expiration notification, and records a receiving time of the lock request.

Further, if the lock renewal request of the primary database is not received, it indicates that the current database is faulty or is performing an upgrade or maintenance operation. Therefore, to normally serve the user as soon as possible, the first processing module 530 selects, as a primary database, a secondary database with the earliest receiving time.

In conclusion, according to the lock arbitration server in this implementation of the present application, when the lock of the primary database expires and is invalid, the secondary database quickly obtains the lock and becomes a new primary database, thereby ensuring that normal services are still provided for the user in a relatively short time, and improving user experience.

In actual applications, after related operations such as maintenance and upgrade are performed on the faulty original primary database, the original primary database can continue to serve the user. Therefore, the lock arbitration server in this implementation of the present application is further configured to receive a lock request from the original primary database after the original primary database is restored, to switch the original primary database to a primary database.

Figure 7:
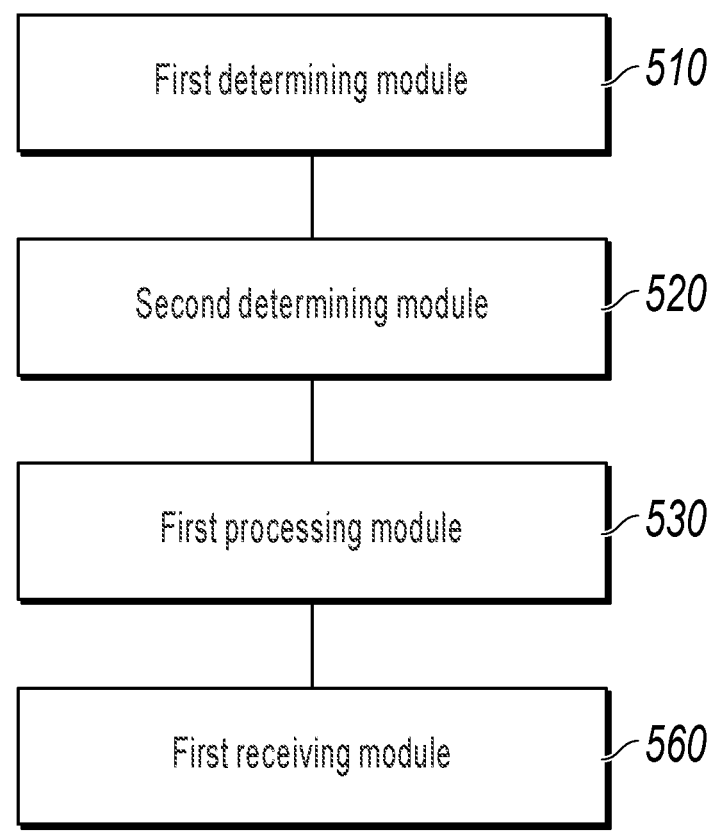
FIG. 7 is a schematic structural diagram illustrating a lock arbitration server, according to another implementation of the present application.

FIG. 7 is a schematic structural diagram illustrating a lock arbitration server, according to another implementation of the present application. As shown in FIG. 7, on the basis of FIG. 5, the lock arbitration server further includes a first receiving module 560. Specifically, in this example, after the first processing module 530 selects one of the secondary databases as a new primary database, the first receiving module 560 always receives a lock request of the original primary database. After the first receiving module 560 receives the lock request of the original primary database, because the priority of the original primary database is higher, the first processing module 530 switches the original primary database to a primary database, and downgrades the current primary database to a secondary database.

Figure 8:
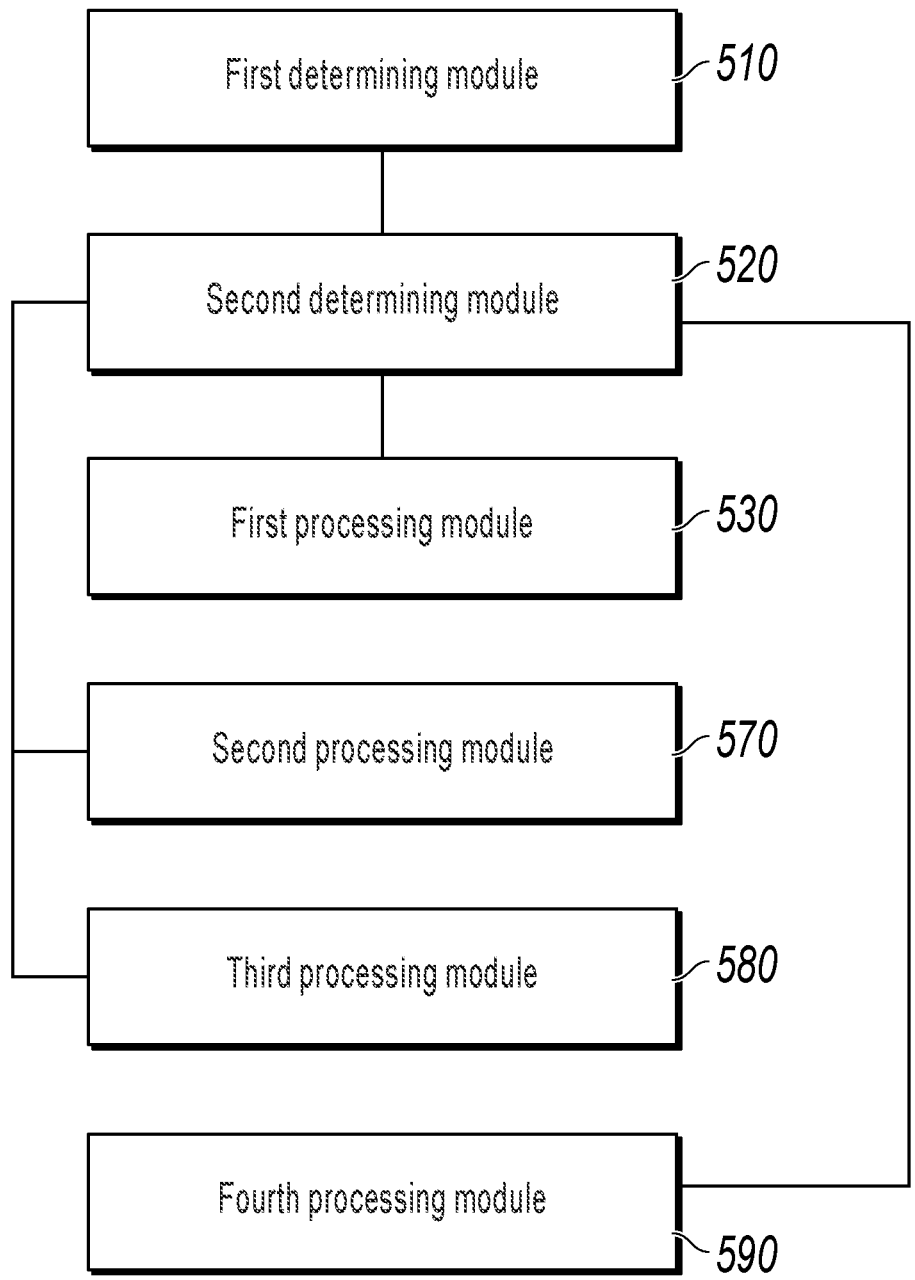
FIG. 8 is a schematic structural diagram illustrating a lock arbitration server, according to still another implementation of the present application.

In an implementation, FIG. 8 is a schematic structural diagram illustrating a lock arbitration server, according to still another implementation of the present application. As shown in FIG. 8, on the basis of FIG. 5, the lock arbitration server further includes a second processing module 570, a third processing module 580, and a fourth processing module 590.

Specifically, after one of the secondary databases is selected as a new primary database, the first determining module 510 continues to determine whether a lock held by the current primary database expires. When the lock held by the current primary database has expired, the second determining module 520 determines whether lock requests of the original primary database, the current primary database, and other secondary databases are received.

When the lock request of the original primary database is received, the second processing module 570 restores the original primary database to a primary database, and restores the current primary database to a secondary database.

Specifically, after the original primary database is restored, the original primary database sends the lock request. Because the priority of the original primary database is higher, after the lock request is received, the second processing module 570 restores the original primary database to a primary database, and restores the current primary database to a secondary database.

If the lock request of the original primary database is not received and the lock requests of the current primary database and the other secondary databases are received, the third processing module 580 maintains the current primary database as a primary database.

Specifically, when the lock request of the original primary database is not received and the current primary database normally updates the lock, the third processing module 580 maintains the current primary database as a primary database.

If the lock requests of the original primary database and the current primary database are not received and the lock requests of the other secondary databases are received, the fourth processing module 590 selects one of the other secondary databases as a primary database, and restores the current primary database to a secondary database.

Specifically, if the lock requests of the original primary database and the current primary database are not received, it indicates that the original primary database is not restored, and the current primary database is also faulty or needs to perform an upgrade operation. Therefore, to normally serve the user, the fourth processing module 590 needs to select, as a primary database, one of the other secondary databases that send the lock requests, and restores the current primary database to a secondary database.

It is worthwhile to note that, for details that are not disclosed in the implementation of the lock arbitration server in the present application, references can be made to the previous implementation of the method for managing primary and secondary databases described with reference to FIG. 1 to FIG. 4. Details are omitted here for simplicity.

In conclusion, after selecting one of the secondary databases as a new primary database, the lock arbitration server in this implementation of the present application continues to determine whether the current primary database receives the lock request of the original primary database and whether the current primary database updates the lock. When the lock request of the original primary database is received, the server restores the original primary database to a primary database, and restores the current primary database to a secondary database. If the lock request of the original primary database is not received, the server determines whether the current primary database updates the lock within a validity period. If no, the server selects one of the other secondary databases as a primary database, and restores the current primary database to a secondary database. According to the lock arbitration server, it is ensured that the original primary database is restored to a primary database after the original primary database is restored, to better serve the user, thereby improving practicality of the method for managing primary and secondary databases in the present application.

To implement the previous implementation, the present application further provides a primary database server.

Figure 9:
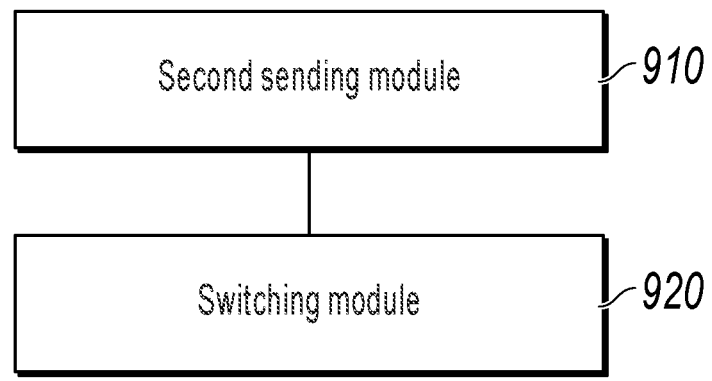
FIG. 9 is a schematic structural diagram illustrating a primary database server, according to an implementation of the present application.

FIG. 9 is a schematic structural diagram illustrating a primary database server, according to an implementation of the present application. As shown in FIG. 9, the primary database server includes: a second sending module 910, configured to send a lock renewal request to a lock arbitration server when a lock held by a primary database expires, so that the lock arbitration server selects one of secondary databases as a new primary database when the lock arbitration server does not receives the lock renewal request; and a switching module 920, configured to control the primary database to be switched to a secondary database.

Specifically, in actual applications, to keep the primary database unchanged, that is, to prevent the primary database from being switched to a secondary database when the primary database is not faulty or performs an upgrade or maintenance operation, a priority of the primary database is higher than a priority of the secondary database, thereby ensuring that a database that holds the lock is the primary database when the primary database is not faulty or performs an upgrade or maintenance operation.

It is worthwhile to note that, there are a plurality of methods for deploying primary and secondary databases, for example, a method for deploying one primary database and one secondary database, or a method for deploying one primary database and a plurality of secondary databases.

For ease of description, this implementation of the present application is described by using an example that the method for deploying primary and secondary databases is a three-data-centers-in-two-locations method. That is, the secondary database includes a hot standby database and a disaster recovery database, the primary database and the hot standby database are located in the same data center, and the primary database and the disaster recovery database are located in different data centers.

Specifically, when the lock held by the primary database expires, the second sending module 910 sends the lock renewal request to the lock arbitration server. If the lock arbitration server does not receive the lock renewal request, it indicates that the primary database is performing an upgrade operation or is faulty, and therefore cannot normally serve a user. As such, the lock arbitration server selects one of the secondary databases as a new primary database, to normally serve the user as soon as possible. In addition, the switching module 920 controls the primary database to be switched to a secondary database.

It should be understood that, to enable the primary database to update the lock in a timely manner and to enable other secondary databases to quickly obtain the lock when the primary database is faulty, the primary database can send, at a relatively short cycle within an update cycle of the lock, a request for querying a status of the lock, to update the lock in a timely manner when the lock is close to expiring and keep the primary database unchanged.

In addition, the secondary database actively sends, at a relatively long cycle, a lock request for querying the status of the lock. Therefore, when the lock of the primary database is invalid, the secondary database can quickly obtain the lock and actively switch to a new primary database, so that services provided for the user are not affected.

For example, the update cycle of the lock is $T1$, the primary database sends, at a cycle $T2$, a lock request for querying the status of the lock, and the secondary database sends, at a cycle T3, a lock request for querying the status of the lock, where T2 is less than T1, and T3 is greater than or equal to T1.

In conclusion, when the lock held by the primary database expires, the primary database server in this implementation of the present application sends the lock renewal request to the lock arbitration server, so that the lock arbitration server selects one of the secondary databases as a new primary database when the lock arbitration server does not receives the lock renewal request; and switches the primary database to a secondary database. When a validity period of the lock held by the primary database cannot be extended, the primary database server switches the primary database to a secondary database, and a secondary database is selected as a new primary database, thereby improving a speed and accuracy of switching between primary and secondary databases, ensuring that the database normally serves a user, and improving user experience.

In actual applications, after related operations such as maintenance and upgrade are performed on the faulty original primary database, the original primary database can continue to serve the user. Therefore, the primary database server in this implementation of the present application is further configured to receive a lock request from the original primary database after the original primary database is restored, to switch the original primary database to a primary database.

Figure 10:
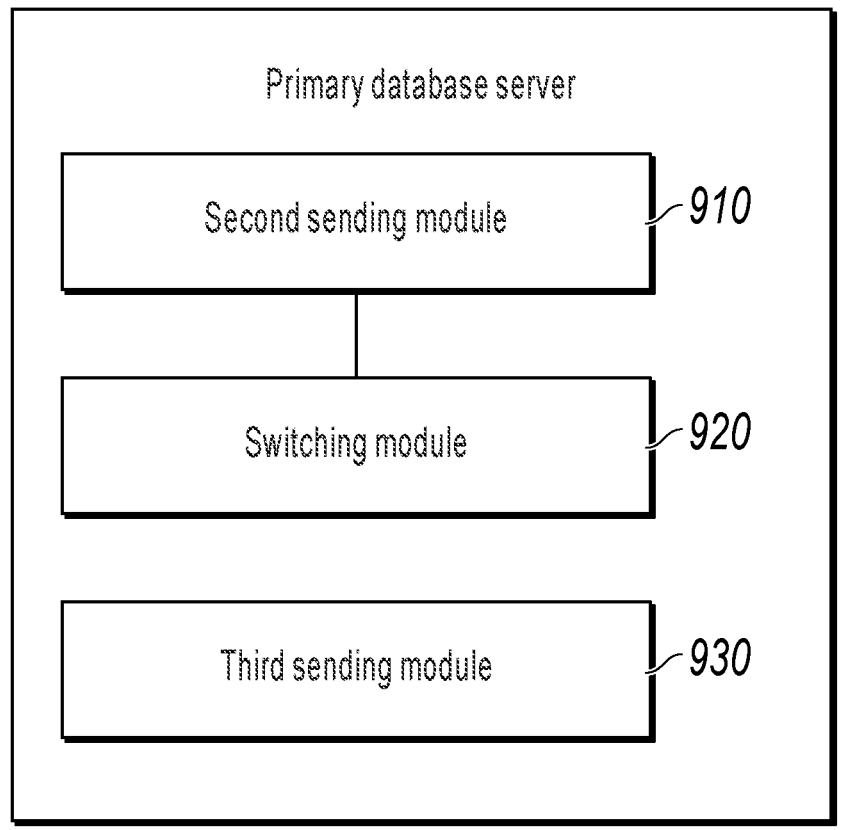
FIG. 10 is a schematic structural diagram illustrating a primary database server, according to a specific implementation of the present application.

FIG. 10 is a schematic structural diagram illustrating a primary database server, according to a specific implementation of the present application. As shown in FIG. 10, on the basis of FIG. 9, the primary database server further includes a third sending module 930.

Specifically, after the original primary database is restored, the third sending module 930 sends a lock request. Because the priority of the original primary database is higher, after the lock request is sent, the lock arbitration server receives the lock request sent by the original primary database, and controls the lock to be held by the original primary database after the lock expires, so that the original primary database is restored to a primary database, and the current primary database is restored to a secondary database.

It should be emphasized that, for details that are not disclosed in the implementation of the primary database server in the present application, references can be made to the method for managing primary and secondary databases described with reference to FIG. 1 to FIG. 4. Details are omitted here for simplicity.

In conclusion, according to the primary database server in this implementation of the present application, it is ensured that the original primary database is restored to a primary database after the original primary database is restored, to better serve the user, thereby improving user experience.

Figure 11:
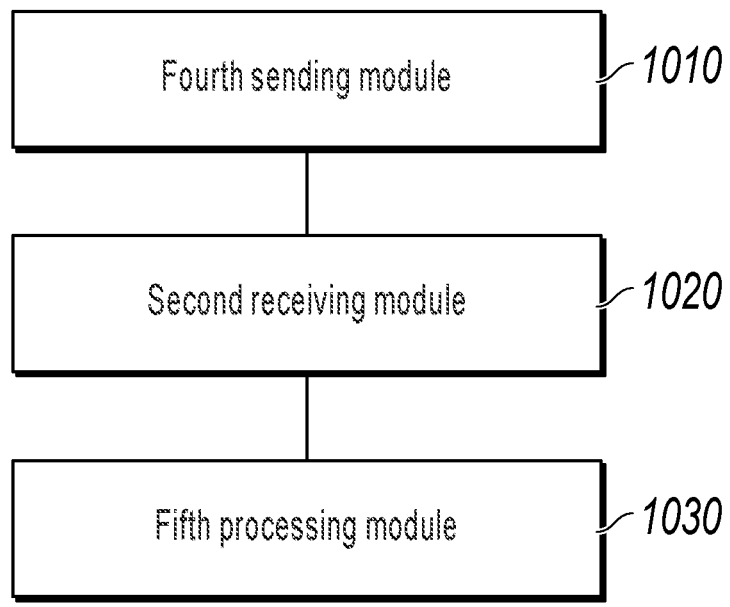
FIG. 11 is a schematic structural diagram illustrating a secondary database server, according to an implementation of the present application.

To implement the previous implementation, the present application further provides a secondary database server. FIG. 11 is a schematic structural diagram illustrating a secondary database server, according to an implementation of the present application. As shown in FIG. 11, the secondary database server includes: a fourth sending module 1010, configured to send a lock request to a lock arbitration server; a second receiving module 1020, configured to receive a lock acknowledgement message sent by the lock arbitration server; and a fifth processing module 1030, configured to switch a secondary database to a new primary database based on the lock acknowledgement message.

It can be understood that, in actual applications, to keep a primary database unchanged, that is, to prevent the primary database from being switched to a secondary database when the primary database is not faulty or performs an upgrade or maintenance operation, a priority of the primary database is higher than a priority of the secondary database, thereby ensuring that a database that holds a lock is the primary database when the primary database is not faulty or performs an upgrade or maintenance operation. However, when the primary database cannot effectively extend a validity period of the lock, the lock arbitration server needs to select one of secondary databases as a primary database to continue to serve a user.

Specifically, the fourth sending module 1010 sends the lock request to the lock arbitration server, so that when the primary database cannot effectively update the lock, the secondary database quickly seizes the lock. The second receiving module 1020 receives the lock acknowledgement message sent by the lock arbitration server, so that the fifth processing module 1030 switches a secondary database to a primary database based on the lock acknowledgement message.

It is worthwhile to note that, there are a plurality of methods for deploying primary and secondary databases, for example, a method for deploying one primary database and one secondary database, or a method for deploying one primary database and a plurality of secondary databases.

For ease of description, this implementation of the present application is described by using an example that the method for deploying primary and secondary databases is a three-data-centers-in-two-locations method. That is, the secondary database includes a hot standby database and a disaster recovery database, the primary database and the hot standby database are located in the same data center, and the primary database and the disaster recovery database are located in different data centers.

In conclusion, the secondary database server in this implementation of the present application sends the lock request to the lock arbitration server, to switch a secondary database to a new primary database when it is determined that the lock held by the primary database is invalid and the primary database cannot normally serve the user, thereby improving a speed and accuracy of switching between primary and secondary databases, ensuring that services can be normally provided for the user, and improving user experience.

Based on the previous implementation, if the secondary database server does not always actively send, at a specific cycle, a lock request for querying a status of the lock, when the lock held by the primary database is invalid, a lock expiration notification is actively sent to each of other secondary databases, so that the secondary database server sends the lock request based on the lock expiration notification, obtains the lock, and becomes a new primary database.

Figure 12:
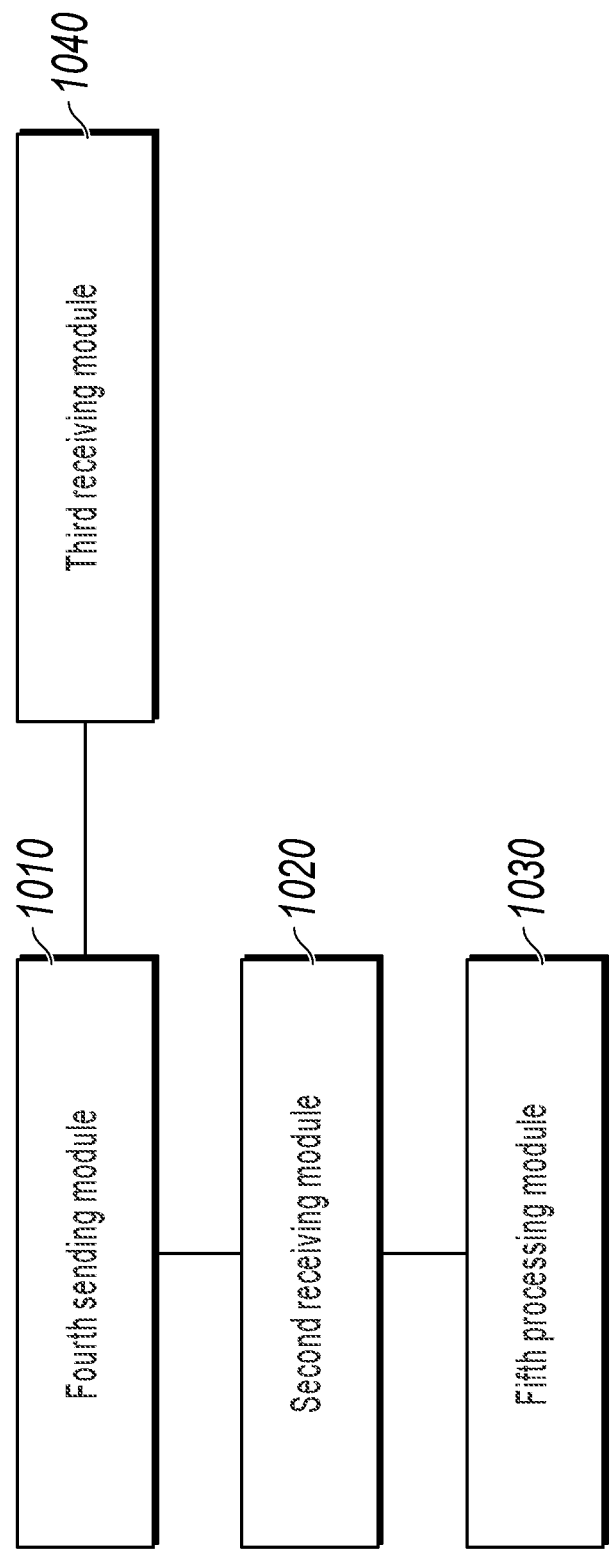
FIG. 12 is a schematic structural diagram illustrating a secondary database server, according to a specific implementation of the present application.

Specifically, FIG. 12 is a schematic structural diagram illustrating a secondary database server, according to a specific implementation of the present application. As shown in FIG. 12, on the basis of FIG. 11, the secondary database server further includes a third sending module 1040.

Specifically, the third receiving module 1040 receives a lock expiration notification sent by the lock arbitration server after the lock arbitration server determines that a lock held by a primary database has expired, where the fourth sending module 1010 sends the lock request to the lock arbitration server based on the lock expiration notification.

Further, when the lock expires, if the lock arbitration server does not receive a lock renewal request of the primary database, it indicates that the current database is faulty or is performing an upgrade or maintenance operation. Therefore, to normally serve the user as soon as possible, the lock arbitration server selects, as a primary database, a secondary database with the earliest receiving time.

In conclusion, based on the secondary database server in this implementation of the present application, when the lock of the primary database expires and is invalid, the secondary database quickly obtains the lock and becomes a new primary database, thereby ensuring that normal services are still provided for the user in a relatively short time, and improving user experience.

In actual applications, after related operations such as maintenance and upgrade are performed on the faulty original primary database, the original primary database can continue to serve the user. Therefore, the secondary database server in this implementation of the present application is further configured to: after the original primary database is restored, switch the current primary database to a secondary database.

Figure 13:
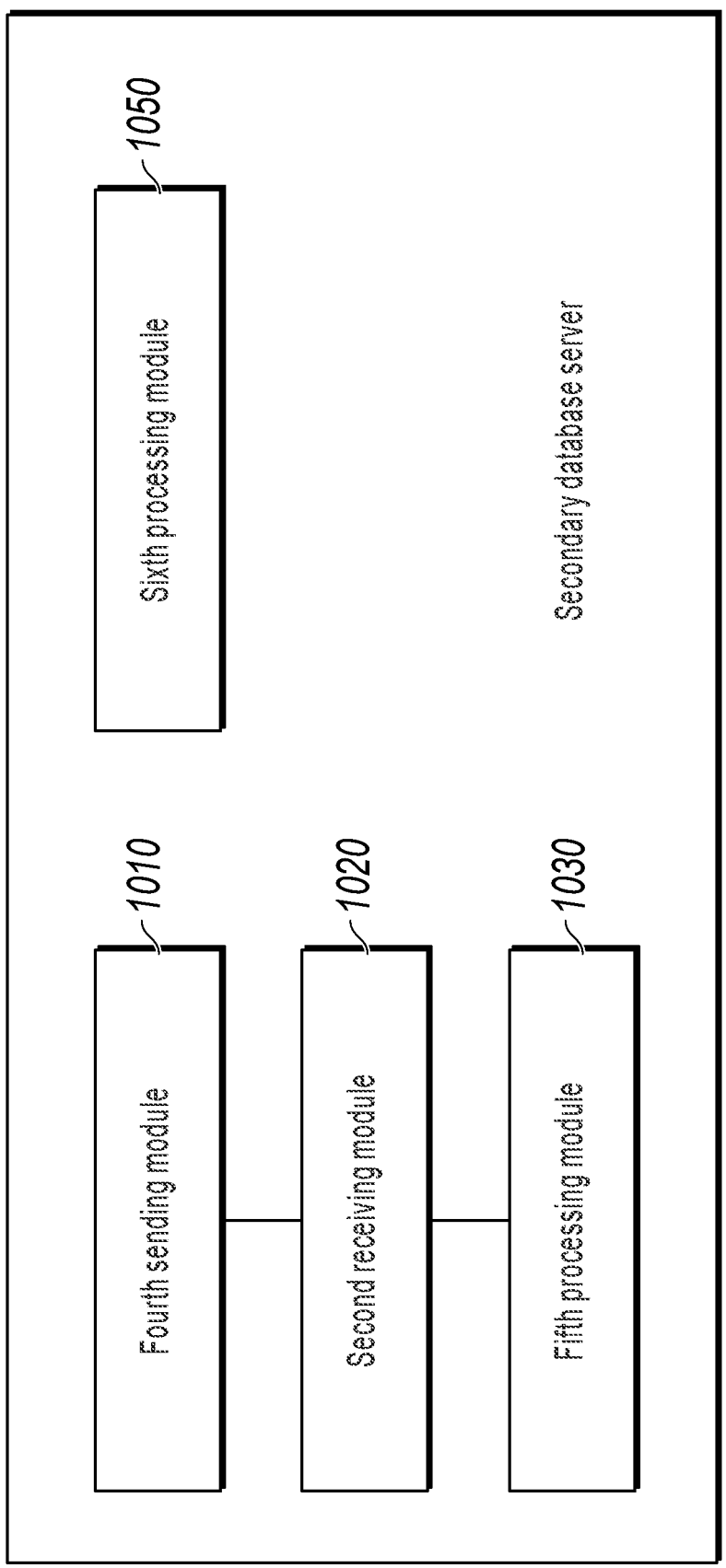
FIG. 13 is a schematic structural diagram illustrating a secondary database server, according to another implementation of the present application.

FIG. 13 is a schematic structural diagram illustrating a secondary database server, according to another specific implementation of the present application. As shown in FIG. 13, on the basis of FIG. 11, the secondary database server further includes a sixth processing module 1050.

Specifically, after the original primary database is restored, the original primary database sends a lock request. Because the priority of the original primary database is higher, after receiving the lock request, the lock arbitration server restores the original primary database to a primary database, and the sixth processing module 1050 restores the current primary database to a secondary database.

It should be understood that, for details that are not disclosed in the implementation of the secondary database server in the present application, references can be made to the method for managing primary and secondary databases described with reference to FIG. 1 to FIG. 4. Details are omitted here for simplicity.

In conclusion, after the original primary database is restored, the secondary database server in this implementation of the present application restores the current primary database to a secondary database, and the arbitration server restores the original primary database to a primary database, to better serve the user, thereby improving user experience.

Figure 14:
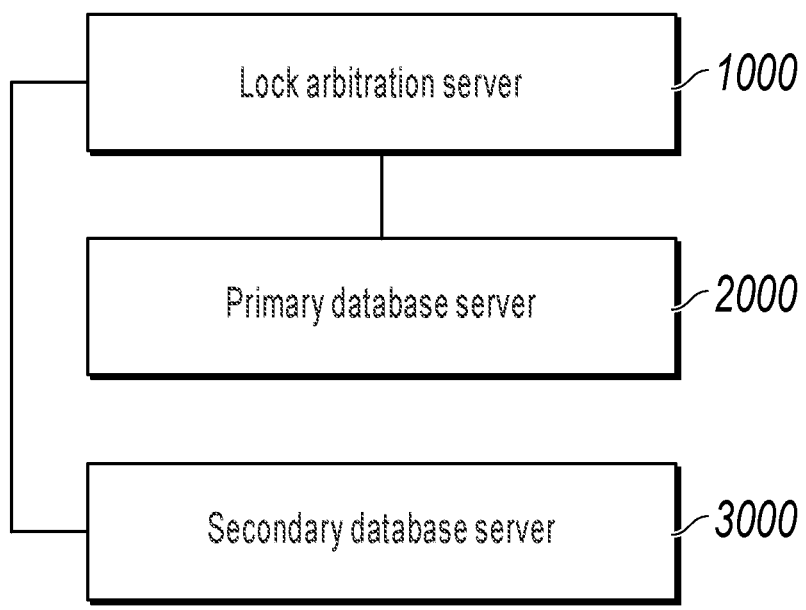
FIG. 14 is a flowchart illustrating a system for managing primary and secondary databases, according to an implementation of the present application.

To implement the previous implementation, the present application further provides a system for managing primary and secondary databases. FIG. 14 is a schematic structural diagram illustrating a system for managing primary and secondary databases, according to an implementation of the present application. As shown in FIG. 14, the system for managing primary and secondary databases includes a lock arbitration server 1000, a primary database server 2000, and a secondary database server 3000.

It is worthwhile to note that, for descriptions of the lock arbitration server 1000, the primary database server 2000, and the secondary database server 3000 in the present application, references can be made to the previous descriptions of the lock arbitration server, the primary database server, and the secondary database server. Details are omitted here for simplicity.

In conclusion, according to the system for managing primary and secondary databases in this implementation of the present application, it is determined whether the lock held by the primary database expires. If it is determined that the lock held by the primary database has expired, it is determined whether the lock renewal request of the primary database is received. If the lock renewal request is not received, one of the secondary databases is selected as a new primary database, and the primary database is controlled to be switched to a secondary database. According to the system, if the primary database does not send the lock renewal request before the lock held by the primary database expires, it is determined that the lock held by the primary database is invalid and the primary database cannot normally serve a user, so that a secondary database is selected as a new primary database, thereby improving a speed and accuracy of switching between primary and secondary databases.

In addition, the terms "first" and "second" are merely used for description, and shall not be understood as an indication or implication of relative importance or implicit indication of the number of indicated technical features. Therefore, a feature limited by "first" or "second" can explicitly or implicitly include at least one such feature. In the descriptions of the present application, "a plurality of" means "at least two", for example, two or three, unless otherwise specifically limited.

In the descriptions of the present specification, reference terms such as "an implementation", "some implementations", "example", "specific example", and "some examples" mean that specific features, structures, materials, or characteristics described with reference to the implementations or examples are included in at least one implementation or example in the present application. In the present specification, the previous examples of the terms are not necessarily with respect to the same implementation or example. In addition, the described specific features, structures, materials, or characteristics can be combined in a proper way in any one or more of the implementations or examples. In addition, a person skilled in the art can integrate or combine different implementations or examples and characteristics of different implementations or examples described in the present specification, provided that they do not conflict with each other.

Although the implementations of the present application are shown and described above, it can be understood that the previous implementations are examples and should not be construed as a limitation on the present application. Within the scope of the present application, a person of ordinary skill in the art can make changes, modifications, replacements, and variations to the previous implementations.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for managing primary and secondary databases, the computer-implemented method comprising:
   determining that a lock held by a primary database has expired, wherein the primary database and the secondary databases share the lock, and wherein the lock is updated to extend a validity period of the lock before the validity period expires, wherein:
the lock is updated during an update cycle having a first time period T1,
the primary database sends, at a cycle with a second time period T2, a lock request for querying a status of the lock, and
a particular secondary database from the secondary databases sends, at a cycle with a third time period T3, a lock request for querying the status of the lock, wherein the second time period T2 is smaller than the first time period T1, and the third time period T3 is greater than or equal to the first time period T1;
in response to determining that the lock held by the primary database has expired, determining that a lock renewal request of the primary database has not been received after the lock has expired; and
in response to determining that the lock renewal request of the primary database has not been received, selecting the particular secondary database as a new primary database, and controlling the primary database to be switched to the secondary database.

2. The computer-implemented method of claim 1, further comprising:
sending a lock expiration notification to the particular secondary database; and
receiving a lock request from the particular secondary database based on the lock expiration notification, and recording a receiving time of the lock request.

3. The computer-implemented method of claim 2, wherein selecting the particular secondary database comprises:
selecting one of the secondary databases with an earliest receiving time.

4. The computer-implemented method of claim 1, wherein a priority of the primary database is higher than a priority of the particular secondary database.

5. The computer-implemented method of claim 1, wherein the particular secondary database comprises a hot standby database and a disaster recovery database, the primary database and the hot standby database are located in a same data center, and the primary database and the disaster recovery database are located in different data centers.

6. The computer-implemented method of claim 1, further comprising:
performing operations comprising at least one of a maintenance or an upgrade on the primary database.

7. The computer-implemented method of claim 6, further comprising:
determining whether the operations comprising at least one of the maintenance and the upgrade on the primary database are completed; and
in response to determining that the operations comprising at least one of the maintenance and the upgrade on the primary database are completed, restoring the primary database.

8. The computer-implemented method of claim 7, wherein after the primary database is restored, the method further comprises:
receiving a lock request sent by an original primary database, and controlling the lock to be held by the original primary database after the lock expires, wherein the original primary database is restored to the primary database, and a current primary database is restored to one of the secondary databases.

9. The computer-implemented method of claim 8, further comprising:
continuing to determine whether a lock held by the current primary database expires; and
in response to determining that the lock held by the current primary database has expired, determining whether lock requests of the original primary database, the current primary database, and other secondary databases are received.

10. The computer-implemented method of claim 8, further comprising:
in response to determining that the lock request of the original primary database is received, restoring the original primary database to the primary database, and restoring the current primary database to one of the secondary databases.

11. The computer-implemented method of claim 8, further comprising:
in response to determining that the lock request of the original primary database is not received and the lock requests of the current primary database and the other secondary databases are received, maintaining the current primary database as the primary database.

12. The computer-implemented method of claim 8, further comprising:
in response to determining that the lock requests of the original primary database and the current primary database are not received and the lock requests of the other secondary databases are received, selecting one of the other secondary databases as the primary database, and restoring the current primary database to one of the secondary databases.

13. A non-transitory, computer-readable medium storing one or more instructions executable by a computer system to perform operations for managing primary and secondary databases, the operations comprising:
determining that a lock held by a primary database has expired, wherein the primary database and the secondary databases share the lock, and wherein the lock is updated to extend a validity period of the lock before the validity period expires, wherein:
the lock is updated during an update cycle having a first time period T1,
the primary database sends, at a cycle with a second time period T2, a lock request for querying a status of the lock, and
a particular secondary database from the secondary databases sends, at a cycle with a third time period T3, a lock request for querying the status of the lock, wherein the second time period T2 is smaller than the first time period T1, and the third time period T3 is greater than or equal to the first time period T1;
in response to determining that the lock held by the primary database has expired, determining that a lock renewal request of the primary database has not been received after the lock has expired; and
in response to determining that the lock renewal request of the primary database has not been received, selecting the particular secondary database as a new primary database, and controlling the primary database to be switched to the secondary database.

14. The non-transitory, computer-readable medium of claim 13, the operations further comprising:
sending a lock expiration notification to the particular secondary database; and
receiving a lock request from the particular secondary database based on the lock expiration notification, and recording a receiving time of the lock request.

15. The non-transitory, computer-readable medium of claim 14, wherein selecting the particular secondary database comprises:
   selecting one of the secondary databases with an earliest receiving time.

16. The non-transitory, computer-readable medium of claim 13, wherein a priority of the primary database is higher than a priority of the particular secondary database.

17. A computer-implemented system for managing primary and secondary databases, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      determining that a lock held by a primary database has expired, wherein the primary database and the secondary databases share the lock, and wherein the lock is updated to extend a validity period of the lock before the validity period expires, wherein:
         the lock is updated during an update cycle having a first time period T1,
         the primary database sends, at a cycle with a second time period T2, a lock request for querying a status of the lock, and
         a particular secondary database from the secondary databases sends, at a cycle with a third time period T3, a lock request for querying the status of the lock, wherein the second time period T2 is smaller than the first time period T1, and the third time period T3 is greater than or equal to the first time period T1;
      in response to determining that the lock held by the primary database has expired, determining that a lock renewal request of the primary database has not been received after the lock has expired; and
      in response to determining that the lock renewal request of the primary database has not been received, selecting the particular secondary database as a new primary database, and controlling the primary database to be switched to the secondary database.

18. The system of claim 17, wherein the operations further comprise:
   sending a lock expiration notification to the particular secondary database; and
   receiving a lock request from the particular secondary database based on the lock expiration notification, and recording a receiving time of the lock request.

19. The system of claim 18, wherein selecting the particular secondary database comprises:
   selecting one of the secondary databases with an earliest receiving time.

20. The system of claim 17, wherein a priority of the primary database is higher than a priority of the particular secondary database.

* * * * *